United States Patent
Takaoka

(10) Patent No.: US 11,920,324 B2
(45) Date of Patent: Mar. 5, 2024

(54) CONTROL METHOD AND CONTROL SYSTEM FOR WORK MACHINE

(71) Applicant: KOMATSU LTD., Tokyo (JP)

(72) Inventor: Yukihisa Takaoka, Tokyo (JP)

(73) Assignee: KOMATSU LTD., Tokyo (JP)

(*) Notice: Subject to any disclaimer, the term of this patent is extended or adjusted under 35 U.S.C. 154(b) by 461 days.

(21) Appl. No.: 17/289,991

(22) PCT Filed: Jan. 20, 2020

(86) PCT No.: PCT/JP2020/001720
§ 371 (c)(1),
(2) Date: Apr. 29, 2021

(87) PCT Pub. No.: WO2020/195048
PCT Pub. Date: Oct. 1, 2020

(65) Prior Publication Data
US 2021/0395978 A1 Dec. 23, 2021

(30) Foreign Application Priority Data
Mar. 22, 2019 (JP) .................... 2019-055090

(51) Int. Cl.
*B62D 12/02* (2006.01)
*E02F 9/20* (2006.01)
*E02F 9/26* (2006.01)

(52) U.S. Cl.
CPC .......... *E02F 9/2054* (2013.01); *E02F 9/2045* (2013.01); *E02F 9/205* (2013.01); *E02F 9/262* (2013.01)

(58) Field of Classification Search
CPC ........ G08G 1/20; H04W 88/04; H04W 4/029; H04W 4/46
See application file for complete search history.

(56) References Cited

U.S. PATENT DOCUMENTS

| | | | |
|---|---|---|---|
| 6,282,468 B1 | 8/2001 | Tamura | |
| 6,313,758 B1 | 11/2001 | Kobayashi | |
| 6,633,800 B1 | 10/2003 | Ward et al. | |
| 7,613,563 B2* | 11/2009 | Haegebarth | G05D 1/0295 |
| | | | 701/422 |
| 8,214,108 B2* | 7/2012 | Post, II | B60W 50/0098 |
| | | | 701/2 |
| 9,378,663 B2 | 6/2016 | Jensen | |

(Continued)

FOREIGN PATENT DOCUMENTS

| | | |
|---|---|---|
| JP | 8-282326 A | 10/1996 |
| JP | 2000-285389 A | 10/2000 |

(Continued)

OTHER PUBLICATIONS

The Office Action for the corresponding Japanese application No. 2019-055090 dated Aug. 16, 2022.
(Continued)

*Primary Examiner* — Dalena Tran
(74) *Attorney, Agent, or Firm* — Global IP Counselors, LLP

(57) ABSTRACT

A first process acquires movement data including a position of a lead machine. A second process controls one or more work machines so that the one or more work machines follows the lead machine based on the movement data.

18 Claims, 7 Drawing Sheets

(56) References Cited

U.S. PATENT DOCUMENTS

| | | | |
|---|---|---|---|
| 10,545,508 B2* | 1/2020 | Hadfield | ............... G05D 1/0287 |
| 10,609,528 B2* | 3/2020 | Doggart | .................. H04W 4/08 |
| 2009/0118889 A1 | 5/2009 | Heino et al. | |

FOREIGN PATENT DOCUMENTS

| | | |
|---|---|---|
| JP | 2000-285398 A | 10/2000 |
| JP | 2000-339599 A | 12/2000 |
| JP | 2003-44141 A | 2/2003 |
| JP | 2016-35707 A | 3/2016 |
| JP | 2017-41188 A | 2/2017 |

OTHER PUBLICATIONS

The International Search Report for the corresponding international application No. PCT/JP2020/001720, dated Mar. 24, 2020.

The Reexamination before Trial for the corresponding Japanese application No. 2019-055090, drafted on Mar. 30, 2023.

* cited by examiner

CONTROL METHOD AND CONTROL SYSTEM FOR WORK MACHINE

CROSS-REFERENCE TO RELATED APPLICATIONS

This application is a U.S. National stage application of International Application No. PCT/JP2020/001720, filed on Jan. 20, 2020. This U.S. National stage application claims priority under 35 U.S.C. § 119(a) to Japanese Patent Application No. 2019-055090, filed in Japan on Mar. 22, 2019, the entire contents of which are hereby incorporated herein by reference.

BACKGROUND

Field of the Invention

The present invention relates to a control system and a control method for a work machine.

Background Information

A technique relating to a method for moving a work machine to a designation area is disclosed, for example, in U.S. Pat. No. 9,378,663. A controller acquires terrain information up to the designation area. The controller decides a movement route of the work machine based on the terrain information. The controller causes the work machine to travel along the movement route.

SUMMARY

However, the controller may not have terrain information outside of the designation area. In this case, an operator operates the work machine manually which results in an increase in manhours. In addition, when a plurality of work machines are made to move to the designation area, there is a further increase in manhours.

An object of the present disclosure is to cause a work machine to move to a designation area with fewer manhours.

A first aspect is a method executed by one or more processors in order to control one or more work machines. The method comprises the following processes. A first process is acquiring movement data which includes a position of a lead machine. A second process is controlling the one or more work machines so that the work machines travel following the lead machine based on the movement data.

A second aspect is a control system for controlling one or more work machines, The control system comprises a sensor and a processor. The sensor detects a position of a lead machine. The processor acquires movement data which indicates the position of the lead machine. The processor controls the one or more work machines so that the work machines travel following the lead machine based on the movement data.

According to the present disclosure, one or more work machines are controlled so as to travel following a lead machine. As a result, the work machines can be moved to a designation area with fewer manhours.

DESCRIPTION OF EMBODIMENTS

Figure 1:
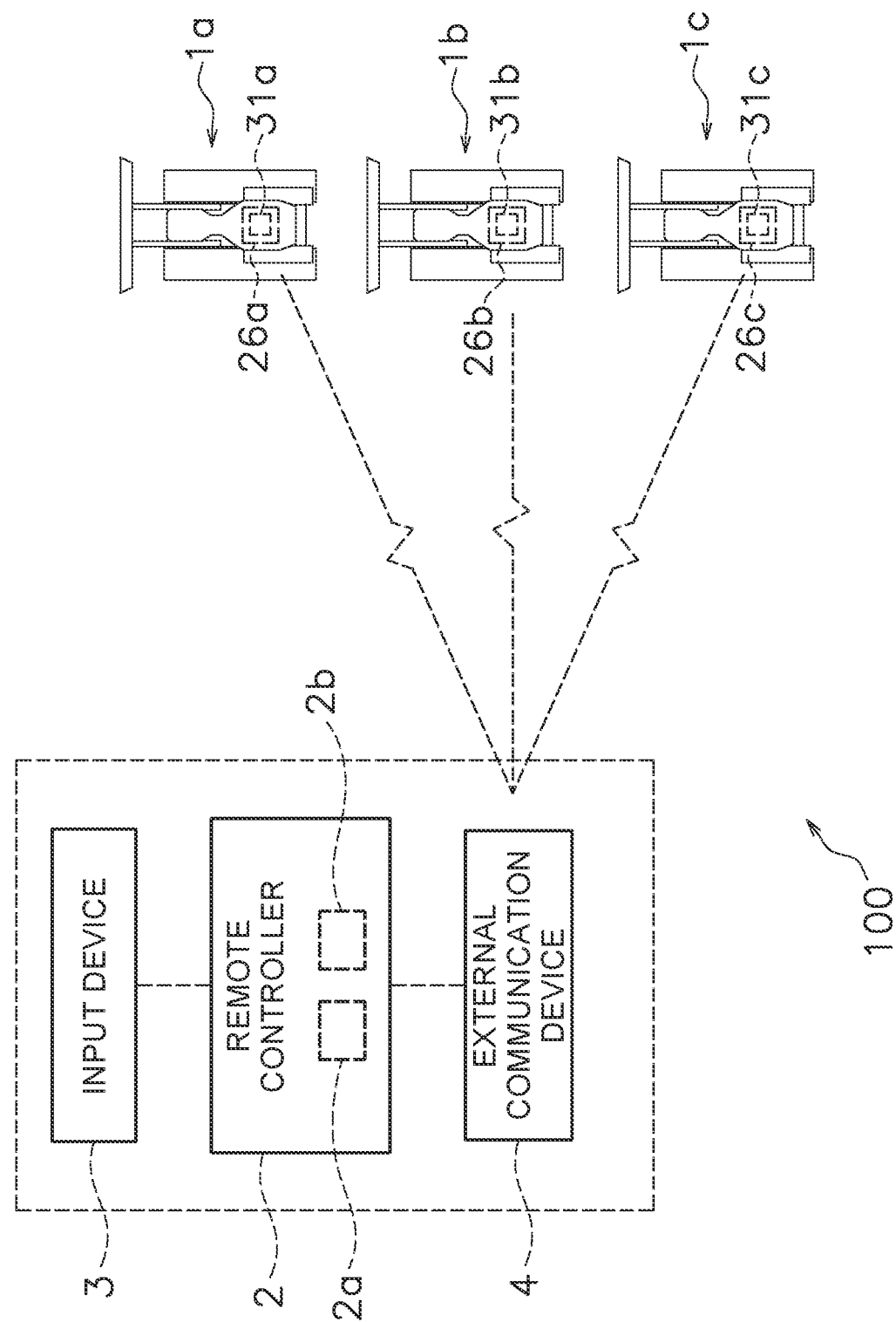
FIG. 1 is a schematic view of a control system for a work machine.

A control system for a work machine according to an embodiment is discussed hereinbelow with reference to the drawings. FIG. 1 is a schematic view of a control system 100 for a work machine according to an embodiment. As illustrated in FIG. 1, the control system 100 includes a remote controller 2, an input device 3, an external communication device 4, and a plurality of work machines 1a to 1c. The remote controller 2, the input device 3, and the external communication device 4 are disposed outside the work machines 1a to 1c. The remote controller 2, the input device 3, and the external communication device 4 are disposed, for example, in a management center outside the work machines 1a to 1c. The remote controller 2 remotely operates the work machines 1a to 1c.

Figure 2:
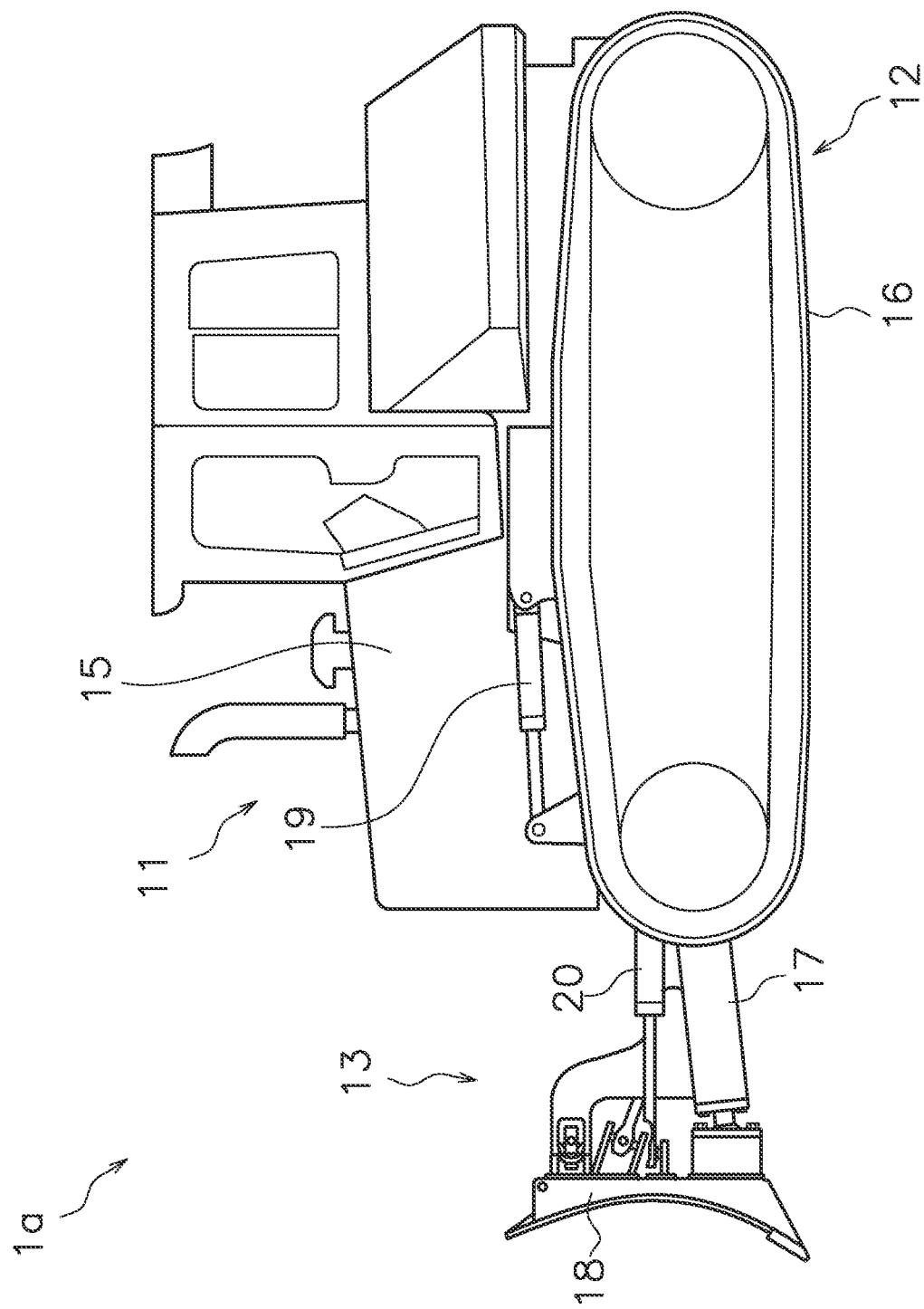
FIG. 2 is a side view of the work machine.
Figure 3:
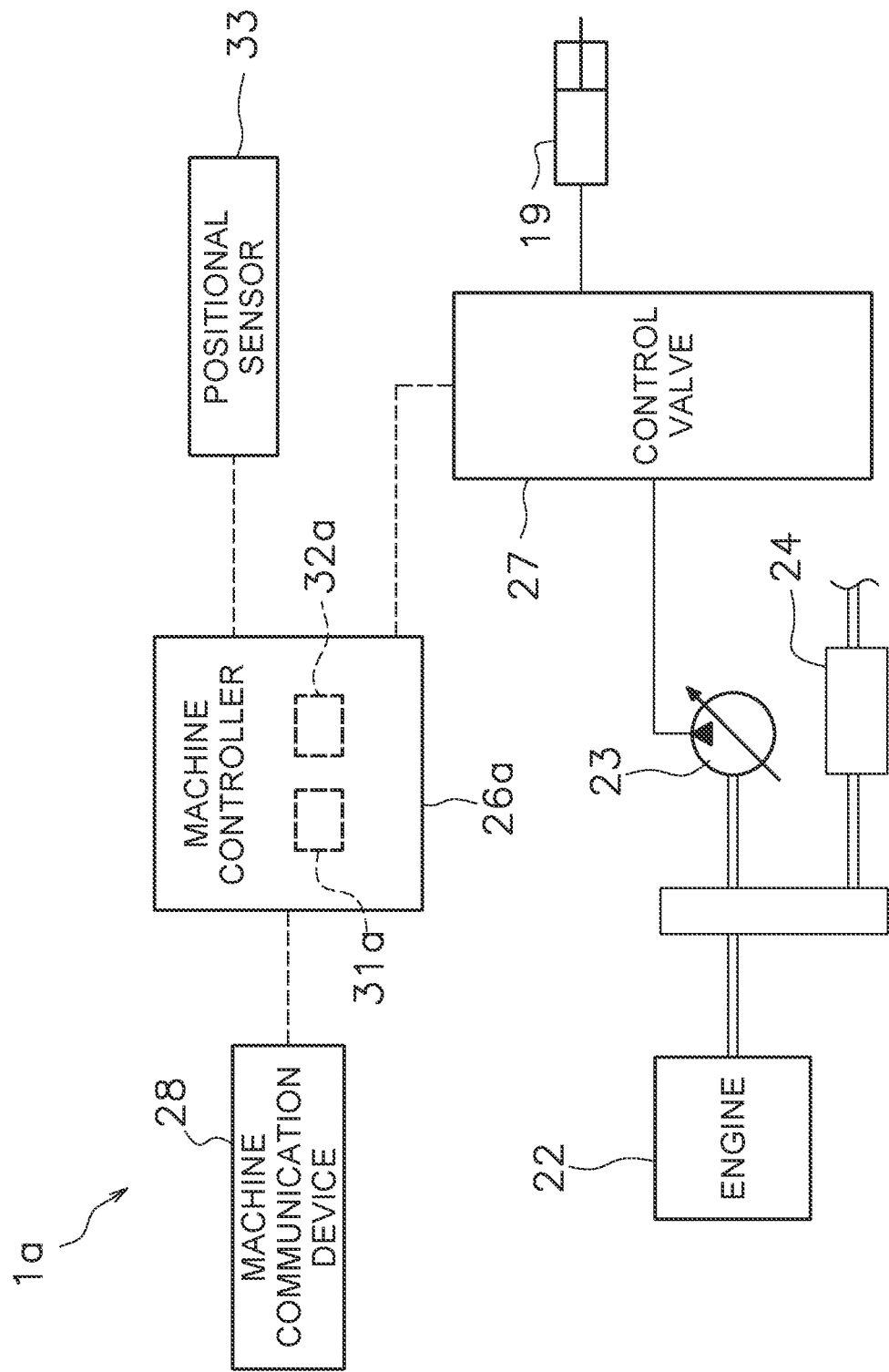
FIG. 3 is a block diagram illustrating a configuration of the work machine.

FIG. 2 is a side view of the work machine 1a. FIG. 3 is a block diagram illustrating a configuration of the work machine 1a. The work machines 1a to 1c according to the present embodiment are bulldozers. While the following explanation pertains to the work machine 1a, the configurations of the other work machines 1b and 1c are the same as that of the work machine 1a.

The work machine 1a includes a vehicle body 11, a travel device 12, and a work implement 13 as illustrated in FIG. 2. The vehicle body 11 includes an engine compartment 15. The travel device 12 is attached to the vehicle body 11. The travel device 12 has left and right crawler belts 16. Only the crawler belt 16 on the left side is illustrated in FIG. 2. The work machine 1a travels due to the rotation of the crawler belts 16.

The work implement 13 is attached to the vehicle body 11. The work implement 13 includes a lift frame 17, a blade 18, and a lift cylinder 19. The lift frame 17 is attached to the vehicle body 11 in a manner that allows movement up and down. The lift frame 17 supports the blade 18. The blade 18 moves up and down accompanying the up and down movements of the lift frame 17. The lift frame 17 may be attached to the travel device 12. The lift cylinder 19 is coupled to the vehicle body 11 and the lift frame 17. The lift frame 17 moves up and down due to the extension and contraction of the lift cylinder 19.

As illustrated in FIG. 3, the work machine 1a includes an engine 22, a hydraulic pump 23, a power transmission device 24, and a control valve 27. The hydraulic pump 23 is driven by the engine 22 to discharge hydraulic fluid. The hydraulic fluid discharged from the hydraulic pump 23 is supplied to the lift cylinder 19. While only one hydraulic pump 23 is illustrated in FIG. 2, a plurality of hydraulic pumps may be provided.

The power transmission device 24 transmits the driving power of the engine 22 to the travel device 12. The power transmission device 24 may be, for example, a hydrostatic transmission (HST). Alternatively, the power transmission device 24 may be, for example, a transmission having a torque converter or a plurality of speed change gears.

The control valve 27 is disposed between the hydraulic pump 23 and hydraulic actuators, such as the lift cylinder 19. The control valve 27 controls the flow rate of the hydraulic fluid supplied to the lift cylinder 19. The control valve 27 may be a pressure proportional control valve. Alternatively, the control valve 27 may be an electromagnetic proportional control valve.

The work machine 1a includes a machine controller 26a and a machine communication device 28. The machine controller 26a controls the travel device 12 or the power transmission device 24 thereby enabling the work machine 1a to travel. The machine controller 26a controls the control valve 27 whereby the blade 18 is made to move up and down.

The machine controller 26a is programmed to control the work machine 1a based on acquired data. The machine controller 26a includes a processor 31a and a storage device 32a. The processor 31a may be, for example, a central processing unit (CPU). Alternatively, the processor 31a may be a processor different to a CPU. The processor 31a executes processing for controlling the work machine 1a in accordance with a program.

The storage device 32a includes a non-volatile memory, such as a ROM, and a volatile memory, such as a RAM. The storage device 32a may include an auxiliary storage device such as a hard disk or a solid state drive (SSD). The storage device 32a is an example of a non-transitory computer-readable recording medium. The storage device 32a stores computer commands and data for controlling the work machine 1a.

The machine communication device 28 communicates wirelessly with the external communication device 4. For example, the machine communication device 28 communicates with the external communication device 4 through a wireless LAN, such as Wi-Fi, a mobile communication network, such as 3G, 4G, or 5G, or another type of wireless communication system.

The work machine 1a includes a positional sensor 33. The positional sensor 33 may include, for example, a global navigation satellite system (GNSS) receiver, such as a global positioning system (GPS). Alternatively, the positional sensor 33 may include a receiver for another type of positioning system. The positional sensor 33 may include a motion sensor, such as an inertial measurement unit (IMU), a ranging sensor such as LIDAR, or an image sensor, such as a stereo camera. The positional sensor 33 outputs position data to the machine controller 26a. The position data represents the position of the work machine 1a.

As illustrated in FIG. 1, the work machine 1b includes a machine controller 26b that is similar to the machine controller 26a of the work machine 1a. The machine controller 26b includes a processor 31b. The work machine 1c includes a machine controller 26c that is similar to the machine controller 26a of the work machine 1a. The machine controller 26c includes a processor 31c. The machine controllers 26b and 26c are both configured in the same way as the machine controller 26a.

The external communication device 4 illustrated in FIG. 1 communicates wirelessly with the machine communication device 28. The external communication device 4 transmits a command signal from the remote controller 2 to the machine communication device 28. The machine controller 26a receives the command signal via the machine communication device 28. The external communication device 4 receives the position data of the work machine 1a via the machine communication device 28.

The input device 3 outputs an operating signal corresponding to an operation by an operator. The input device 3 outputs the operating signal to the remote controller 2. The input device 3 includes operation pieces, such as an operating lever, a pedal, or a switch, for operating the work machine 1a. The input device 3 may include a touch screen.

The remote controller 2 includes a processor 2a and a storage device 2b. The processor 2a may be, for example, a central processing unit (CPU). Alternatively, the processor 2a may be a processor different to a CPU. The processor 2a executes processing for controlling the work machine 1a in accordance with a program.

The storage device 2b includes a non-volatile memory, such as a ROM, and a volatile memory, such as a RAM. The storage device 2b may include an auxiliary storage device, such as a hard disk or a solid state drive (SSD). The storage device 2b is an example of a non-transitory computer-readable recording medium. The storage device 2b stores computer commands and data for controlling the work machine 1a.

The remote controller 2 determines the commands for the work machine 1a in response to the operation of the input device 3. Consequently, the travel of the work machine 1, such as forward travel, reverse travel, or turning, is controlled in response to the operation of the input device 3. The operation of the work implement 13, such as raising or lowering, is controlled in response to the operation of the input device 3. Similarly, the remote controller 2 determines the commands for the work machines 1b and 1c in response to the operation of the input device 3.

Figure 4:
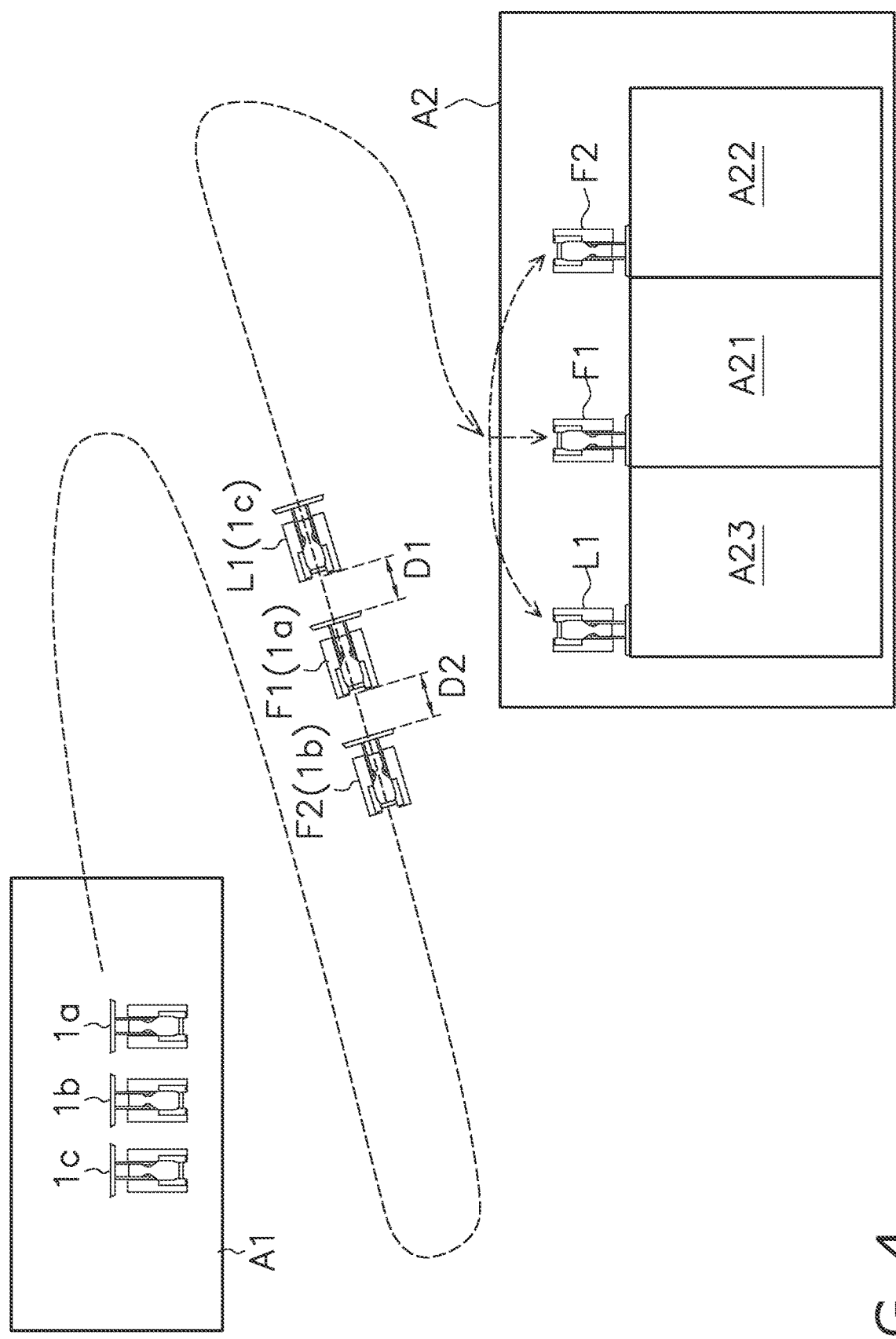
FIG. 4 is a schematic top view of a work site of the work machine.

Autonomous travel of the work machines 1a to 1c executed by the control system 100 will be explained next. FIG. 4 is a top view of a work site of the work machines 1a to 1c. As illustrated in FIG. 4, the work site includes a standby area A1 and a designation area A2. The plurality of the work machines 1a to 1c are disposed in the standby area A1. For example, the standby area A1 is a parking area or a service area. The designation area A2 is an area where the plurality of work machines 1a to 1c perform work. The designation area A2 is an example of a first area. The control system 100 causes the work machines 1a to 1c to travel from the standby area A1 to the designation area A2.

Figure 5:
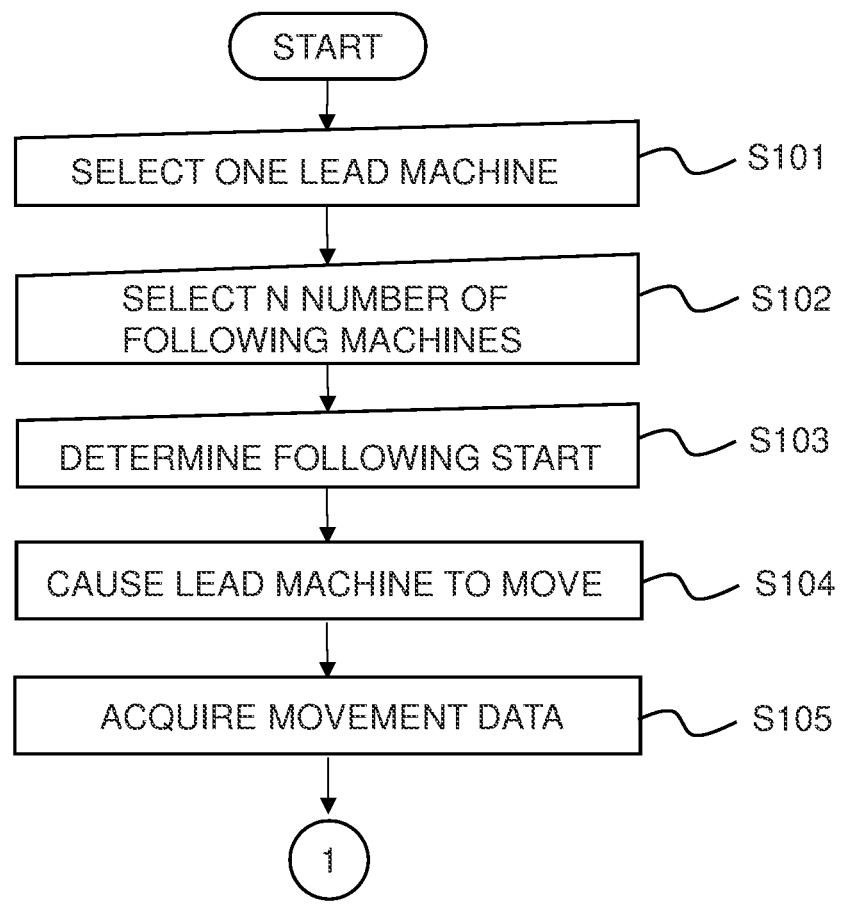
FIG. 5 is a flow chart illustrating processing for autonomous travel.
Figure 6:
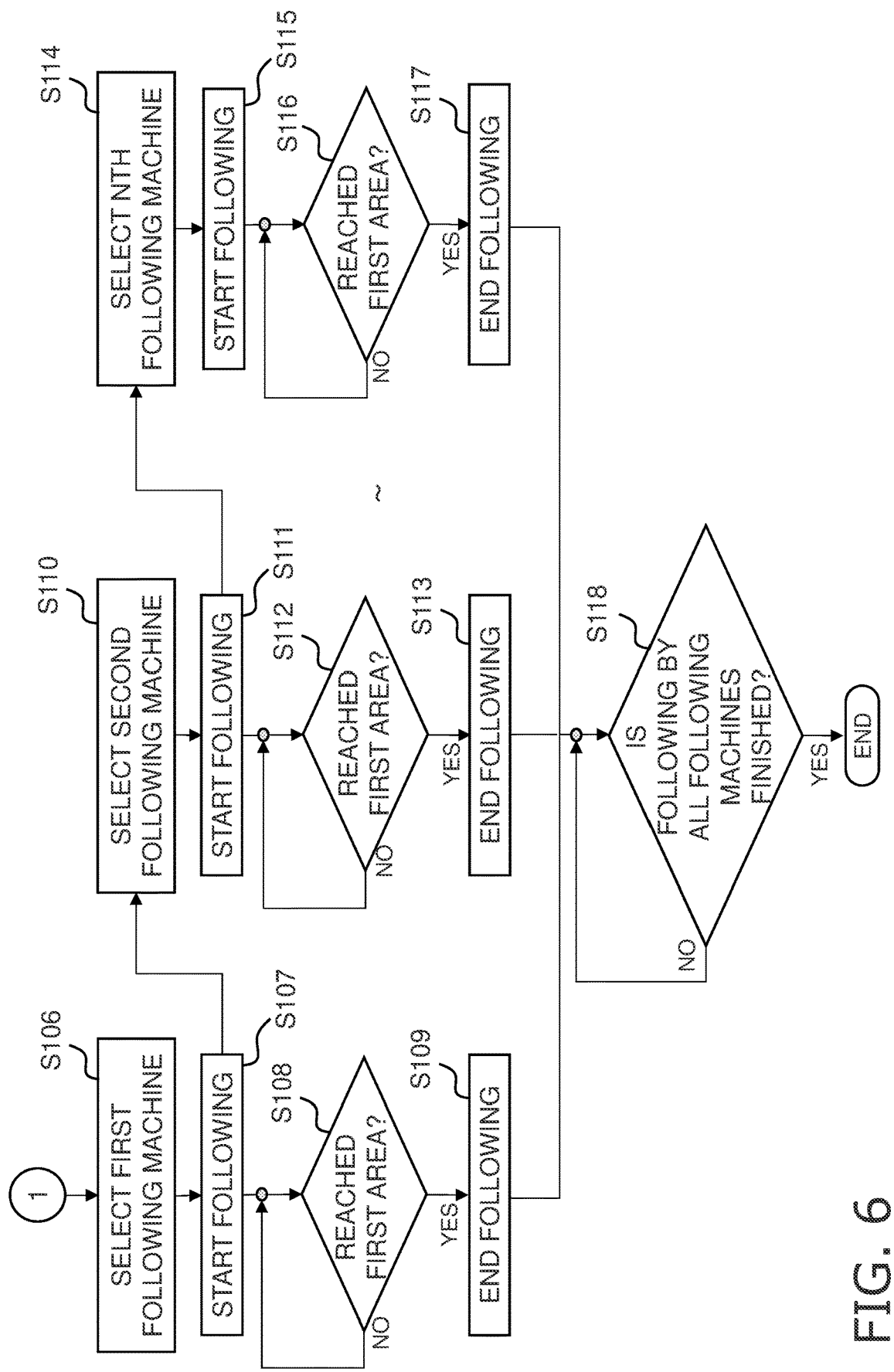
FIG. 6 is a flow chart illustrating processing for autonomous travel continuing from the flowchart of FIG. 5.
Figure 7:
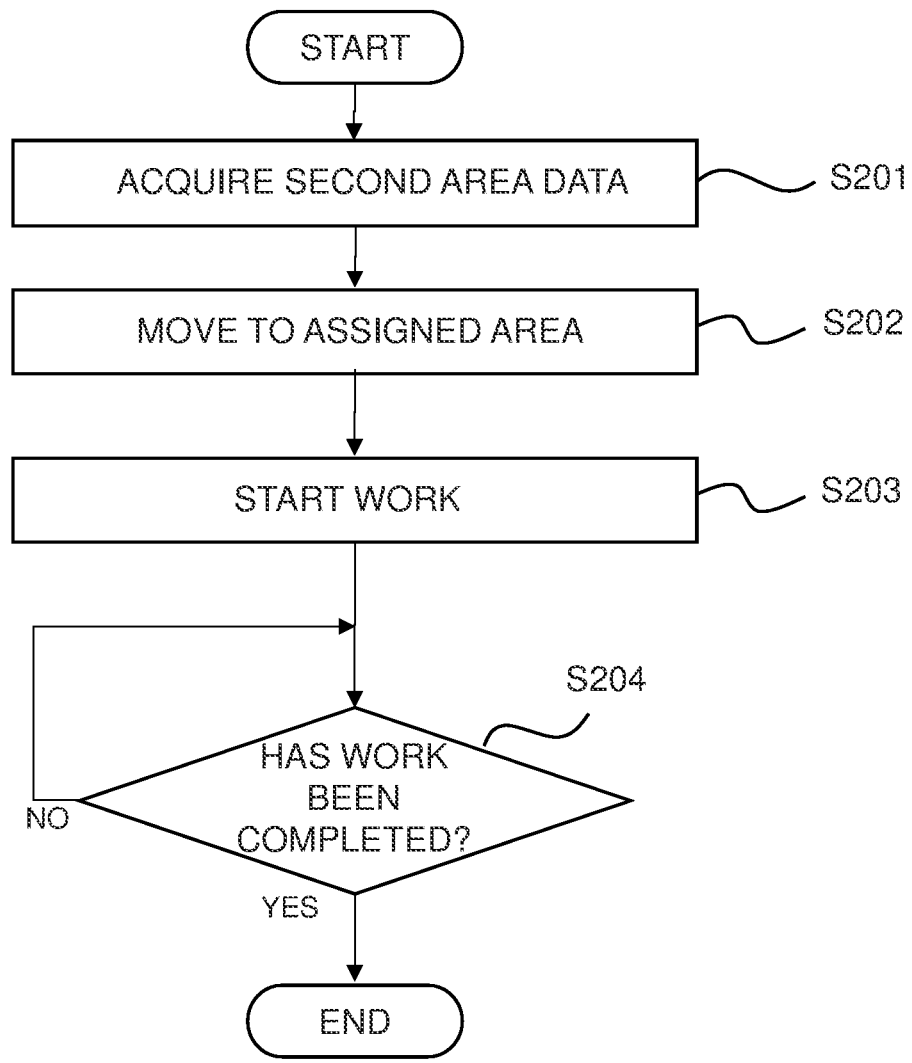
FIG. 7 is a flow chart illustrating processing for autonomous travel after reaching a designation area.

FIG. 5 to FIG. 7 are flow charts which illustrate processing of the autonomous travel executed by the remote controller 2 or by the machine controller 26a to 26c. As illustrated in step S101 in FIG. 5, the remote controller 2 selects one lead machine L1. The remote controller 2 selects one of the plurality of work machines 1a to 1c as the lead machine L1 based on an operation on the input device 3 by the operator. In the following explanation, the work machine 1c is selected as the lead machine L1.

In step S102, the remote controller 2 selects N number of following machines F1 and F2. The following machines F1 and F2 are work machines that are made to travel following the lead machine L1. In FIG. 4, the number N of the following machines F1 and F2 is two, but N is not limited to two. N may be one. N may also be an integer greater than two. The remote controller 2 selects the following machines F1 and F2 based on an operation on the input device 3 by the operator.

The remote controller 2 determines the order of travel of the N number of following machines F1 and F2. For example, the remote controller 2 determines the order of travel of the N number of following machines F1 and F2 in the order selected by the operator. Alternatively, the remote controller 2 may automatically determine the order of travel of the N number of following machines F1 and F2.

In the following explanation, the work machines 1a and 1b are respectively selected as the following machines F1 and F2 as an example. The work machine 1a is selected as the following machine F1 which is the first machine in the order of travel, and the work machine 1b is selected as the following machine F2 which is the second machine in the order of travel.

In step S103, the remote controller 2 determines a following start. The remote controller 2 may determine the following start in response to an operation of the input device 3 by the operator. Alternatively, the remote controller 2 may determine the following start automatically. When the remote controller 2 determines the following start, the processing advances to step S104.

As illustrated in step S104, the remote controller 2 causes the lead machine L1 to move. The remote controller 2 may cause the lead machine L1 to move in response to an operation of the input device 3 by the operator. That is, the remote controller 2 may remotely control the lead machine L1 in response to a signal from the input device 3. Alternatively, the remote controller 2 may automatically cause the lead machine L1 to move. For example, the remote controller 2 may cause the lead machine L1 to move in accordance with a previously set route. Alternatively, the machine controller 26c of the lead machine L1 may compute an optimal route.

In step S105, the remote controller 2 acquires movement data. The movement data includes the position of the lead machine L1. The movement data includes the movement route of the lead machine L1. The remote controller 2 acquires the movement data based on the position data from the lead machine L1. The processing thereafter advances to step S106 in FIG. 6.

In step S106, the remote controller 2 selects the following machine F1 which is the first machine in the order of travel. In step S107, the machine controller 26a starts the following by the first following machine F1. The remote controller 2 transmits the movement data to the machine controller 26a of the first following machine F1.

The machine controller 26a controls the first following machine F1 so as to travel following the lead machine L1 based on the movement data. The movement data represents the movement route of the lead machine L1. The machine controller 26a controls the first following machine F1 so that the first following machine F1 follows the movement route of the lead machine L1. As illustrated in FIG. 4, the machine controller 26a causes the first following machine F1 to travel with a predetermined vehicular gap D1 with respect to the lead machine L1.

In step S108, the remote controller 2 assesses whether the first following machine F1 has reached the designation area A2. The remote controller 2 assesses whether the first following machine F1 has reached the designation area A2 based on the position data of the first following machine F1. The remote controller 2 stores first area data. The first area data represents the position of the designation area A2 at the work site. When the first following machine F1 has reached the designation area A2, in step S109, the remote controller 2 ends the following by the first following machine F1.

In step S107 as explained above, when the following by the first following machine F1 is started, the remote controller 2 selects, in step S110, the following machine F2 which is second in the order of travel. In step S111, the machine controller 26b starts the following by the second following machine F2. The remote controller 2 transmits the movement data to the machine controller 26b of the second following machine F2. The machine controller 26b controls the second following machine F2 so as to travel following the lead machine L1 based on the movement data. The machine controller 26b controls the second following machine F2 so that the second following machine F2 follows the travel route of the lead machine L1. As illustrated in FIG. 4, the machine controller 26b causes the second following machine F2 to travel at a predetermined vehicular gap D2 with respect to the first following machine F1. The vehicular gap D2 may be the same as the vehicular gap D1 or may be different.

In step S112, the remote controller 2 assesses whether the second following machine F2 has reached the designation area A2. The remote controller 2 assesses whether the second following machine F2 has reached the designation area A2 based on the position data of the second following machine F2. When the second following machine F2 has reached the designation area A2, in step S113, the remote controller 2 ends the following by the second following machine F2.

When there are three or more following machines, the remote controller 2 performs the same control on the third and subsequent following machines as the control performed on the first and second following machines F1 and F2. The processing in steps S114 to S117 in FIG. 6 are the same as steps S106 to S109 and steps S110 to S113 and descriptions thereof will be omitted.

Due to the processing explained above, the N number of following machines F1 and F2 are controlled so as to travel following the lead machine L1 according to the order of travel. In step S118, the remote controller 2 assesses whether the following by all of the following machines F1 and F2 is finished. When the following by all of the following machines F1 and F2 has been completed, the remote controller 2 ends the processing for moving the work machines 1a to is to the designation area A2.

FIG. 7 is a flow chart illustrating processing by the machine controller 26a of the first following machine F1 after the first following machine F1 has reached the designation area A2. As illustrated in step S201 in FIG. 7, the machine controller 26a acquires second area data. The second area data represents the position of an area A21 assigned to the first following machine F1 within the designation area A2.

The assigned area A21 may be previously determined and saved in the storage device 2b or the storage device 32a. Alternatively, the assigned area A21 may be acquired by computing performed by the remote controller 2 or the machine controller 26a.

In step S202, the machine controller 26a controls the first following machine F1 so that the first following machine F1 moves to the assigned area A21. For example, the second area data includes a work starting position. The machine controller 26a causes the first following machine F1 to move to the work starting position of the assigned area A21.

The machine controller 26a may cause the first following machine F1 to move automatically to the assigned area A21 after the first following machine F1 has reached the designation area A2. Alternatively, the machine controller 26a may cause the first following machine F1 to move to the assigned area A21 when a command is received from the remote controller 2 after the first following machine F1 has reached the designation area A2.

In step S203, the machine controller 26a starts the work of the first following machine F1. The machine controller 26a controls the first following machine F1 so that the first following machine F1 performs predetermined work in the assigned area A21. The predetermined work is, for example, excavating. Alternatively, the predetermined work may be other work, such as earth piling.

In step S204, the machine controller 26a assesses whether the work has been completed. The machine controller 26a ends the work when it has been assessed that the work has been completed. For example, the machine controller 26a assesses whether the work has been completed when the first following machine F1 has reached a predetermined end position. Alternatively, the machine controller 26a may assess that the work has been completed when the terrain is formed to a desired shape.

The machine controller 26b of the second following machine F2 executes the same above-mentioned processing as the machine controller 26a of the first following machine F1 For example, the machine controller 26b of the following machine F2 controls the following machine F2 so as to move to an area A22 assigned to the following machine F2 and perform work.

The machine controller 26c of the lead machine L1 executes the same above-mentioned processing as the machine controller 26a of the first following machine F1. For example, the machine controller 26c of the lead machine L1 controls the lead machine L1 so as to move to an area A23 assigned to the lead machine L1 and perform work.

When the remote controller 2 has assessed that all of the work of the work machines 1a to 1c has been completed, the remote controller 2 may cause the work machines 1a to 1c to move from the designation area A2 to the standby area A1 by autonomous travel in the same way as mentioned above. That is, the remote controller 2 may control the following machines F1 and F2 so that the following machines F1 and F2 travel following the lead machine L1. The selection of the lead machine L1 and the following machines F1 and F2 may be changed. The order of travel of the following machines F1 and F2 may be changed.

As explained above, in the control system 100 for the work machine is according to the present embodiment, the plurality of following machines F1 and F2 are controlled so as to travel following the lead machine L1. As a result, the plurality of work machines 1a to 1c can be caused to move to the designation area A2 with fewer manhours. Alternatively, the plurality of work machines 1a to 1c can be made to move to the standby area A1 with fewer manhours. Although an embodiment of the present invention has been described, the present invention is not limited to the above embodiment and various modifications may be made within the scope of the invention.

The work machine is not limited to a bulldozer, and may be another type of machine, such as a wheel loader, a motor grader, a hydraulic excavator, or the like. The work machine may be a vehicle driven by an electric motor.

The remote controller 2 or the machine controllers 26a to 26c may each have a plurality of controllers separate from each other. The above-mentioned processing of the remote controller 2 and the machine controllers 26a to 26b may distributed and executed among the plurality of controllers. The remote controller 2 and the machine controllers 26a to 26b may each have a plurality of processors. The above-mentioned processing may distributed and executed among the plurality of processors.

The order of execution of the processing of the remote controller 2 or the machine controllers 26a to 26b is not limited to the above embodiment and may be changed. A portion of the processing of the machine controllers 26a to 26b may be executed by the remote controller 2. A portion of the processing of the remote controller 2 may be executed by the machine controllers 26a to 26b.

The remote controller 2 may assess the state of the lead machine L1. The state of the lead machine L1 may include, for example, slippage, repaid deceleration, or rapid acceleration. The remote controller 2 may stop or temporarily interrupt the following by the following machines F1 and F2 in response to the state of the lead machine L1. Alternatively, the remote controller 2 may cause the following machines F1 and F2 to decelerate or travel in reverse.

The lead machine may be determined in advance without an operation by the operator. The lead machine may be automatically determined by the remote controller 2. The following machines may be determined in advance without an operation by the operator. The following machines may be automatically determined by the remote controller 2. The lead machine may be a type of machine different to the following machines. Processing for selecting the work machines to be moved and processing for designating the lead machine from among the selected machines may be executed in place of the above-mentioned step S101 and step S102. The remaining machines among the selected work machines may be determined as the following machines.

An intervention operation of the following machines may be possible with an operation of the input device 3 by the operator even during the above-mentioned travel control. For example, when one machine among the lead machine and the following machines is unable to travel, the operator may perform an operation to cause another work machine to travel.

In the above embodiment, N number of following machines F1 and F2 are controlled according to the movement data of the lead machine L1. However, the second and subsequent following machines may be controlled according to the movement data of the preceding following machine.

For example, the remote controller 2 may transmit movement data of the mth (where $1 \leq m \leq N-1$) following machine to the machine controller of the m+1th following machine. The machine controller of the m+1th following machine may be controlled so as to travel following the mth following machine based on the movement data of the mth following machine. That is, the machine controller may control the m+1th following machine so that the m+1th following machine follows the travel route of the mth following machine.

The machine controller of each following machine may control the following machine so as to follow a target point included on the lead machine. For example, the machine controller may acquire the position of the target point with a camera. Alternatively, the machine controller may acquire the position of the target point by means of a wireless signal from the lead machine without the intermediation of the remote controller. The machine controller may control the following machine so as to follow the target point.

In the above embodiment, the machine controllers 26a to 26c acquire the second area data after reaching the designation area A2. However, the machine controllers 26a to 26c may acquire the second area data at the standby area A1. Alternatively, the machine controllers 26a to 26c may acquire the second area data at another location.

In the above embodiment, the machine controller 26a causes the first following machine F1 to move to the assigned area A21 after the first following machine F1 has reached the designation area A2. However, the first following machine F1 may be moved to the assigned area A21 manually in response to an operation of the input device 3 by the operator after the first following machine F1 has reached the designation area A2. The other following machine F2 or the lead machine L1 may be operated in the same way.

According to the present disclosure, one or more work machines are controlled so as to travel following a lead machine. As a result, the work machines can be moved to a designation area with fewer manhours.

What is claimed is:

1. A method executed by one or more processors in order to control one or more work machines, the method comprising
    acquiring movement data including a position of a lead machine, and
    controlling the one or more work machines to follow the lead machine based on the movement data,
    assessing a state of the lead machine, and
    stopping the following by the one or more work machines in response to the state of the lead machine.

2. The method according to claim 1, further comprising
    selecting, from a plurality of work machines, the one or more work machines to be moved,
    the controlling the one or more work machines including controlling the selected one or more work machines to follow the lead machine.

3. The method according to claim 1, further comprising selecting one among the plurality of work machines as the lead machine.

4. The method according to claim 1, further comprising
    determining an order of travel of the plurality of work machines, and
    controlling the one or more work machines to follow the lead machine in accordance with the order of travel.

5. The method according to claim 1, further comprising
    acquiring first area data indicative of a position of a first area in a work site,
    acquiring second area data indicative of a position of an assigned area to the one or more work machines, the assigned area being included in the first area,
    assessing whether the one or more work machines is positioned in the first area, and
    when the one or more work machines is positioned in the first area, controlling the one or more work machines to move to the assigned area.

6. The method according to claim 5, further comprising controlling the one or more work machines to perform predetermined work in the assigned area.

7. The method according to claim 1, further comprising
    acquiring a signal from an external input device operated by an operator, and
    remotely controlling the lead machine in response to the signal from the input device.

8. The method according to claim 1, further comprising
    acquiring a signal from an external input device operated by an operator, and
    remotely controlling the one or more work machines in response to the signal from the input device.

9. The method according to claim 1, wherein
    the position data indicates a travel route of the lead machine, and
    the controlling the one or more work machines includes controlling the one or more work machines so that the one or more work machines follows the travel route.

10. A control system for controlling one or more work machines, the system comprising
    a sensor that detects a position of a lead machine, and
    a processor configured to
        acquire movement data including the position of the lead machine,
        control the one or more work machines to follow the lead machine based on the movement data,
        assess a state of the lead machine, and
        stop the following by the one or more work machines in response to the state of the lead machine.

11. The system according to claim 10, wherein
    the processor is configured to
        select, from a plurality of work machines, the one or more work machines to be moved, and
        control the selected one or more work machines to follow the lead machine.

12. The system according to claim 10, wherein
    the processor is configured to select one among the plurality of work machines as the lead machine.

13. The system according to claim 10, wherein
    the processor is configured to
        determine an order of travel of the plurality of work machines, and
        control the one or more work machines to follow the lead machine in accordance with the order of travel.

14. The system according to claim 10, wherein
    the processor is configured to
        acquire first area data indicative of a position of a first area in a work site,
        acquire second area data indicative of a position of an assigned area to the one or more work machines, the assigned area being included in the first area,
        assess whether the one or more work machines is positioned in the first area, and
        when the one or more work machines is positioned in the first area, control the one or more work machines to move to the assigned area.

15. The system according to claim 14, wherein
    the processor is configured to control the one or more work machines to perform predetermined work in the assigned area.

16. The system according to claim 10, wherein
    the processor is configured to
        acquire a signal from an external input device operated by an operator, and
        remotely control the lead machine in response to the signal from the input device.

17. The system according to claim 10, wherein
    the processor is configured to
        acquire a signal from an external input device operated by an operator, and
        remotely control the one or more work machines in response to the signal from the input device.

18. The system according to claim 10, wherein
    the position data indicates a travel route of the lead machine, and
    the processor is configured to control the one or more work machines so that the one or more work machines follows the travel route.

* * * * *